US012776960B2

(12) United States Patent
Mahajan et al.

(10) Patent No.: US 12,776,960 B2
(45) Date of Patent: Oct. 27, 2026

(54) DELIVERABILITY SCORING SYSTEMS AND METHODS

(71) Applicant: TWILIO INC., San Francisco, CA (US)

(72) Inventors: Amit Mahajan, San Francisco, CA (US); Alireza Farasat, San Francisco, CA (US); Lohit Pratap Singh, San Francisco, CA (US); Sergio de Jesus Leottau, San Francisco, CA (US); Benjamin Croes, San Francisco, CA (US); Joshua Ramsden-Pogue, San Francisco, CA (US); Diego Gustavo Guevara, San Francisco, CA (US); Andrés Darío Sánchez Lugo, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/774,397

(22) Filed: Jul. 16, 2024

(65) Prior Publication Data

US 2026/0025318 A1 Jan. 22, 2026

(51) Int. Cl.

| | |
|---|---|
| ***G06F 15/173*** | (2006.01) |
| ***G06F 11/07*** | (2006.01) |
| ***H04L 41/147*** | (2022.01) |
| ***H04L 41/16*** | (2022.01) |

(52) U.S. Cl.

CPC ........ *H04L 41/147* (2013.01); *G06F 11/0793* (2013.01); *H04L 41/16* (2013.01)

(58) Field of Classification Search

CPC ..... H04L 41/147; H04L 41/16; G06F 11/0793

See application file for complete search history.

(56) References Cited

U.S. PATENT DOCUMENTS

2008/0186870 A1 8/2008 Butts et al.
2020/0327008 A1* 10/2020 Singh ...................... G06F 9/451

FOREIGN PATENT DOCUMENTS

CN 118132448 A 6/2024
CN 118233213 A 6/2024

OTHER PUBLICATIONS

International Search Report and Written Opinion for International Application No. PCT/US2025/037869, mailed Sep. 25, 2025, 13 Pages.

* cited by examiner

*Primary Examiner* — Joseph R Maniwang
(74) *Attorney, Agent, or Firm* — Lowenstein Sandler LLP

(57) ABSTRACT

A computing device can assign possible error codes to subscore bins. The subscore bins can include a sent rate bin, a compliance rate bin, a fraud bin, a latency bin, and an engagement bin. The computing device can transmit network traffic messages and receive actual error codes associated with the network traffic messages. The actual error codes can overlap with and include some or all of the possible error codes. A subscore can be calculated for each subscore bin based on the actual error codes received. A deliverability score can be calculated based on the subscore for each subscore bin.

20 Claims, 6 Drawing Sheets

DELIVERABILITY SCORING SYSTEMS AND METHODS

TECHNICAL FIELD

The present systems and processes relate to providing a deliverability score for outgoing network traffic messages (e.g., SMS, MMS, other messaging platforms).

BACKGROUND

Network traffic messages (e.g., SMS, MMS, other messages sent on messaging platforms) can be sent for a variety of purposes, including but not limited to verifying customers or clients (e.g., verifying the identity of the customer or clients, verifying the account of the customer or client, one-time passwords, two-factor authentication), sending alerts or notifications to customer or clients, sending marketing or promotional materials/messages to customers or clients, or providing customer service to customers or clients. However, due to various errors, network traffic messages can fail to be delivered to the intended destination address. Destination addresses can be invalid, network traffic messages can be blocked, the network traffic messages can fail to comply with certain policies, one-time passwords included in network traffic messages can fail to convert, and recipients can opt-out of receiving network traffic messages. Even when network traffic messages fail to reach their intended destination addresses, the sender of the network traffic messages have to pay a fee to transmit every network traffic message.

While network traffic messages can fail to deliver or cause some other error, no system exists for measuring the overall performance of the outgoing network traffic messages transmitted or queued for transmission during a predetermined period of time. Therefore, there is a long-felt but unresolved need for a single measure of the performance, functioning, and health of outgoing network traffic messages.

BRIEF SUMMARY OF THE DISCLOSURE

Briefly described, and according to one embodiment, aspects of the present disclosure generally relate to a deliverability scoring system, which can provide a deliverability score for outgoing network traffic messages (e.g., SMS, MMS, other messaging platforms, including social media messaging). The deliverability score can represent the health, functioning, and/or performance of the outgoing network traffic messages. As will be understood by the foregoing, the deliverability score can represent a measure of the overall performance of the network traffic messages transmitted by a user of the deliverability scoring system during a predetermined period of time with a single number.

The deliverability score can include subscores, which can represent a specific aspect of the performance of network traffic messages. The deliverability score can include any number of subscores representing different aspects or components of the performance, functioning, and health of the outgoing network traffic messages. As an illustrative and non-limiting example, the subscores can include a sent rate subscore, a compliance subscore, a fraud subscore, a latency subscore, and an engagement subscore.

Each subscore can include an associated subscore bin. Each subscore bin can be assigned a code, for example possible error codes. Once network traffic messages have been sent or queued for sending, the deliverability scoring system can receive an actual error code associated with each of the network traffic messages. The error code can represent that the network traffic message failed to be delivered to the destination address or can represent some other error. The possible error codes can represent some or all of the potential error codes that the deliverability scoring system can receive in response to transmitting a network traffic message.

After the deliverability scoring system transmits the network traffic messages or queues the network traffic messages for transmission, the deliverability scoring system can receive zero or one actual error code associated with each network traffic message. The actual error codes can be matched to a possible error code, and depending on which possible error code match, the actual error code can be used to calculate the subscore associated with the subscore bin that the matching possible error code is assigned to. The subscores can be calculated based on the actual error codes received in response to the network traffic messages transmitted within a predetermined period of time (e.g., 1 hour, 1 day, 1 week, 1 month, 1 year). The deliverability scoring system can calculate each subscore dividing total number of the actual error codes associated with a particular subscore bin by the total number of network traffic messages minus the total number of actual error codes not associated with the particular subscore bin (e.g., associated with a different subscore bin than the particular subscore bin). The subscores can each be distributed between their respective minimum and maximum score. By distributing the subscores between their minimum and maximum score, each subscore can be weighted such that each subscore will be appropriately weighted (e.g., represented) in the deliverability score. The deliverability score can be calculated by adding or summing the subscores.

The subscores and the deliverability score can be rendered on an online dashboard. A recommendation for improving each subscore can be presented. If the recommendation is accepted, a remedial action (e.g., the remedial action described in the recommendation) can be performed to improve the subscore.

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
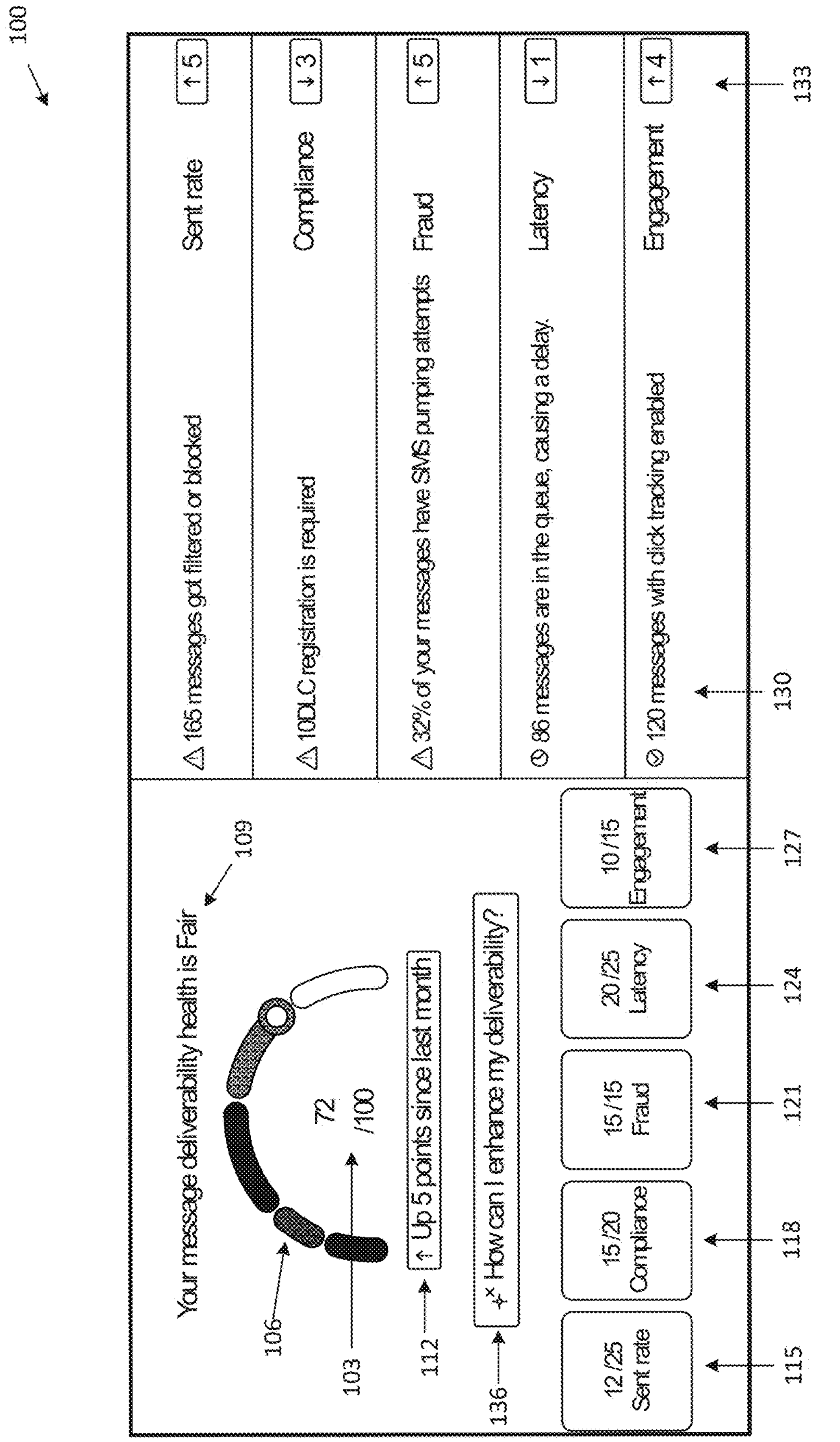
FIG. 1 illustrates a deliverability score dashboard according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

OVERVIEW

Aspects of the present disclosure generally relate to a deliverability scoring system, which can provide a deliverability score for outgoing network traffic messages (e.g., SMS, MMS, other messaging platforms, including social media messaging). The deliverability score can include a minimum score and a maximum score. For example, in some embodiments, the deliverability score can include any number between 20 and 100 (e.g., 20 can be the minimum score, 100 can be the maximum score) and can represent the health, functioning, and/or performance of the outgoing network traffic messages. In some other embodiments, the deliverability score can range from zero to any number greater than zero. In some other embodiments, the deliverability score can include negative numbers (e.g., numbers less than zero). For example, a deliverability score can be high if most of the outgoing network traffic messages are delivered to their destination address. A deliverability score can be considered high if it exceeds a first threshold and considered low if it falls below a second threshold. The first and second thresholds may be the same or the first threshold may be higher than the second threshold. As another example, a deliverability score can be low if a large portion of the outgoing network traffic messages fail to comply with the policies of the deliverability scoring system. As another example, network traffic messages may be sent in response to a request for verification, which may be part of an artificially inflated traffic scheme (e.g., SMS pumping). If a large portion of network traffic messages are transmitted in response to a fraudulent artificially inflated traffic scheme, the deliverability score can be low. As another example, if the network traffic messages take longer than expected to be delivered to a destination address after being queued, the deliverability score can be low. As another example, network traffic messages can include one-time passwords. If a high percentage of the one-time passwords are converted (e.g., actually used), the deliverability score can be high. As will be understood by the foregoing, the deliverability score can represent a measure of the overall performance of the network traffic messages transmitted by a user during a predetermined period of time with a single number.

The deliverability score can include subscores, which can represent a specific aspect of the performance of network traffic messages. The deliverability score can include any number of subscores representing different aspects or components of the performance, functioning, and health of the outgoing network traffic messages. As an illustrative and non-limiting example, the subscores can include a sent rate subscore, a compliance subscore, a fraud subscore, a latency subscore, and an engagement subscore. The sent rate subscore can represent the rate of successfully sent network traffic messages. The compliance subscore can represent the portion of compliant outgoing network traffic messages. The fraud subscore can represent the portion of network traffic messages being sent in response to a fraudulent scheme (e.g., SMS pumping, artificially inflated traffic schemes, phishing attempts). The latency subscore can represent if the network traffic messages are being delivered within an expected window of time. The engagement subscore can represent the portion of network traffic messages being engaged with by the recipient. The deliverability score can represent the performance of the outgoing network traffic messages related to each subscore (e.g., the sent rate subscore, the compliance subscore, the fraud subscore, the latency subscore, and the engagement subscore).

Each subscore can include an associated subscore bin. Each subscore bin can be assigned possible error codes. Once network traffic messages have been sent or queued for sending, the deliverability scoring system can receive a code, for example an error code, associated with each of the network traffic messages. The error codes can include an alphanumeric code associated with an error that occurred before, during, or after transmitting a network traffic message. The error code can represent that the network traffic message failed to be delivered to the destination address or can represent some other error. The possible error codes can represent some or all of the potential error codes that the deliverability scoring system can receive in response to transmitting a network traffic message.

After the deliverability scoring system transmits the network traffic messages or queues the network traffic messages for transmission, the deliverability scoring system can receive zero or one actual error code associated with each network traffic message. The actual error codes can be compared to the possible error codes. When a matching possible error code is identified, the actual error code can be saved to the subscore bin associated with the matching possible error code. By saving the actual error code to the subscore bin, the actual error code can be used to calculate the subscore associated with the subscore bin. Each actual error code can be matched to one possible error code, and thus, can be used to calculate one particular subscore.

The subscores can be calculated based on the actual error codes received in response to the network traffic messages transmitted within a predetermined period of time (e.g., 1 hour, 1 day, 1 week, 1 month, 1 year). The deliverability scoring system can calculate each subscore dividing total number of the actual error codes associated with a particular subscore bin by the total number of network traffic messages minus the total number of actual error codes not associated with the particular subscore bin (e.g., associated with a different subscore bin than the particular subscore bin). In some embodiments, the subscores can include a performance metric unrelated to the actual error codes. For example, the latency score can include a time scale score (e.g., performance metric), which can represent if network traffic messages are taking longer than expected to be delivered to the destination address. As another example, the engagement score can include a message outcome score (e.g., performance metric), which can indicate if the recipient interacted with the network traffic message (e.g., accessed an included hyperlink, opted-in or out of network traffic messages, converted a one-time password). As another example, a benchmark for each subscore (e.g., performance metric) can be determined by applying a machine learning algorithm to the historical network traffic messages. The subscores can each be distributed between their respective minimum and maximum score. By distributing and scaling the subscores between their minimum and maximum score, each subscore can be weighted such that each subscore will be appropriately weighted (e.g., represented) in the deliverability score. The deliverability score can be calculated by adding or summing the subscores.

The subscores and the deliverability score can be rendered on an online dashboard accessible through a web browser or native application. The dashboard can include trends and/or changes to each subscore and the deliverability score. A recommendation for improving each subscore can be presented. If the recommendation is accepted, a remedial action (e.g., the remedial action described in the recommendation) can be performed to improve the subscore.

EXEMPLARY EMBODIMENTS

Referring now to the figures, for the purposes of example and explanation of the fundamental processes and components of the disclosed systems and processes, reference is made to FIG. 1, which illustrates the deliverability score dashboard 100. As will be understood by one having ordinary skill in the art, the deliverability score dashboard 100 (the "dashboard 100") can be displayed to a user of the deliverability scoring system disclosed herein. The dashboard 100 can include a deliverability score 103. The deliverability score 103 can represent the overall measure of performance of outgoing network traffic messages (e.g., SMS, MMS, other messaging platforms, including social media messaging). The deliverability score 103 can include any number between 20 and 100 (e.g., the minimum deliverability score 103 can be 20 and the maximum deliverability score can be 100). In some other embodiments, the deliverability score 103 can range from zero to any number greater than zero. In some other embodiments, the deliverability score 103 can be a percentage between 0% and 100%. As will be understood, a "high" score can include any score one standard deviation above the mean, while a "low" score can include any score one standard deviation below the mean. For illustrative purposes, the deliverability score 103 shown by FIG. 1 can be 72 out of 100.

The deliverability score 103 can represent the overall performance of outgoing network traffic messages, including SMS, MMS, and other messages (e.g., messages on a social media platform, messages on a proprietary platform). The network traffic messages can be sent by a user to their customers or clients for any purpose, including but not limited to, verifying customers or clients (e.g., verifying the identity of the customer or clients, verifying the account of the customer or client, one-time passwords, two-factor authentication), sending alerts or notifications to customer or clients, sending marketing or promotional materials/messages to customers or clients, or providing customer service to customers or clients. Several factors can affect the deliverability score 103, including but not limited to, the successful sent rate of network traffic messages, sending errors (e.g., undeliverable destination), compliance errors (e.g., errors caused due to failing to comply with the policies of the deliverability scoring system), fraud errors (e.g., SMS pumping, artificially inflated traffic attack, phishing attacks), latency errors (e.g., time to send messages exceeding the expected time), and engagement rate and errors (e.g., link click through rate, messaging opt-out, one-time password conversion rate).

The deliverability score 103 can be calculated for one account (e.g., one user of the deliverability scoring system) or multiple subaccounts associated with one user. The deliverability score can be calculated for a single type of outgoing network traffic messages (e.g., SMS, MMS, other messaging platforms, including social media messaging) or across multiple types of outgoing network traffic messages.

In addition to the deliverability score 103, the dashboard 100 can include a deliverability score gauge 106, a deliverability score category 109, and a deliverability score change 112. The deliverability score gauge 106 (the "gauge 106") can provide a visual representation of the deliverability score 103. The gauge 106 can include different colors and sections to further represent the deliverability score 103. In some embodiments, the gauge 106 can include a bar, a slider, a graph, or any other visual representation of the deliverability score 103.

The deliverability score category 109 (the "category 109") can represent a category that the deliverability score 103 falls within. The category 109 can include any number of categories for representing the deliverability score 103 (e.g., 2, 3, 5, 10). For example, the category 109 can include, but is not limited to, bad, poor, fair, good, and excellent categories. Each category can include a range of deliverability scores 103 that fall within that category. For illustrative purposes, the bad category can include deliverability scores 103 between 20 and 39, the poor category can include deliverability scores 103 between 40 and 55, the fair category can include deliverability scores 103 between 56 and 74, the good category can include deliverability scores 103 between 75 and 90, and the excellent category can include deliverability scores 103 between 91 and 100. As shown by FIG. 1, the category 109 can be fair since the deliverability score 103 can be 72 out of 100.

The deliverability score change 112 can illustrate or display the change to the deliverability score 103 over a period of time. The deliverability score 103 can be calculated based on the network traffic messages transmitted during a predetermined period of time (e.g., 1 day, 1 week, 1 month). The deliverability score change 112 can illustrate or display the change in the deliverability score 103 from the previous period of time. For example, if the deliverability score 103 is calculated every week, the deliverability score change 112 can illustrate or display the change to the deliverability score 103 over the past week. The deliverability score change 112 can display the number of points increased or decreased from the previous period of time. As shown by FIG. 1, the deliverability score change 112 can state that the deliverability score 103 increased 5 points from the last month. In some embodiments, the deliverability score 103 can be illustrated by a line graph showing the deliverability score 103 over time.

The deliverability score 103 can include subscores. The subscores can represent a specific aspect of the performance of network traffic messages. The deliverability score 103 can include any number of subscores representing different aspects or components of the performance, functioning, and health of the outgoing network traffic messages. For example, the deliverability score 103 can include a sent rate subscore 115. The sent rate subscore 115 can represent the rate of successfully sent network traffic messages. A high sent rate subscore 115 can represent that a high percentage of network traffic messages have been successfully sent, while a low sent rate subscore 115 can represent that a low percentage of network traffic messages have been successfully sent. Network traffic messages can fail to send for any reason, including but not limited to, deliverability errors (e.g., messages are not able to be delivered), invalid destination addresses, and blocked network traffic messages.

As another example, the deliverability score 103 can include a compliance subscore 118. The compliance subscore 118 can represent the percentage of compliant outgoing network traffic messages. A high compliance subscore 118 can represent a high percentage of compliant network traffic messages, while a low compliance subscore 118 can represent a low percentage of compliant network traffic messages. Network traffic messages can fail to comply with the policies of the deliverability scoring system for any reason, including but not limited to, the system blocking the network traffic messages as spam, issues with toll-free destination addresses (e.g., toll-free numbers), suspended accounts or campaigns, and other policy violations.

As another example, the deliverability score 103 can include a fraud subscore 121. The fraud subscore 121 can represent the portion of network traffic messages being sent in response to a fraudulent scheme (e.g., SMS pumping, artificially inflated traffic schemes, phishing attempts). A high fraud subscore 121 can represent a low percentage of network traffic messages being sent in response to a fraudulent scheme, while a low fraud subscore 121 can represent a high percentage of network traffic messages being sent in response to a fraudulent scheme. In some embodiments, the deliverability scoring system can block network traffic messages from being sent due to fraud or malicious content.

As another example, the deliverability score 103 can include a latency subscore 124. The latency subscore 124 can represent the time for network traffic messages to be delivered. A higher latency subscore 124 can represent that network traffic messages are being sent within an expected time period, while a lower latency subscore 124 can represent that network traffic messages are taking longer than the expected time period to send. Network traffic messages can take longer than the expected time period to send for any reason, including but not limited to, message queue overflow and excessive network traffic messages.

As another example, the deliverability score 103 can include an engagement subscore 127. The engagement subscore 127 can represent the portion of network traffic messages being engaged with by the recipient. A high engagement subscore 127 can represent that a high percentage of recipients are engaging with the network traffic messages (e.g., clicking a link included in the network traffic message, opting into communications, one-time password conversion), while a low engagement subscore 127 can represent that a high percentage of recipients are not engaging with the network traffic message (e.g., not clicking the link included in the network traffic message, opting out of communications, failure to convert one-time passwords).

As will be understood by those having skill in the art, the deliverability score 103 can include any possible subscore representing the performance, functioning, or health of the outgoing network traffic messages. The sent rate subscore 115, the compliance subscore 118, the fraud subscore 121, the latency subscore 124, and the engagement subscore 127 can represent some of the possible subscores included in the deliverability score 103. Various embodiments of the deliverability score 103 can include some, all, or none of the subscores 115, 118, 121, 124, and 127.

As an illustrative non-limiting example, the subscores 115, 118, 121, 124, and 127 can be a number between 0 and 25. In some other embodiments, the subscores 115, 118, 121, 124, and 127 can range from zero to any number greater than zero. In some embodiments, the subscore 115, 118, 121, 124, and 127 can include negative numbers (e.g., any number less than zero). In some other embodiments, the subscores 115, 118, 121, 124, and 127 can be a percentage between 0% and 100%. Each of the subscores 115, 118, 121, 124, and 127 can include a minimum score and a maximum score. As an illustrative non-limiting example, the maximum scores of the subscores 115, 118, 121, 124, and 127 can add to 100. The minimum and maximum score for each subscore can be based on the weighting of the subscores. As any example, the minimum scores for each of the subscores can be any value greater than zero. For example, the sent rate subscore 115 can include a maximum score of 25, the compliance subscore 118 can include a maximum score of 20, the fraud subscore 121 can include a maximum score of 15, the latency subscore 124 can include a maximum score of 25, and the engagement subscore 127 can include a maximum score of 15. Continuing this example, the sent rate subscore can represent a first percentage (e.g., 25%) of the deliverability score 103, the compliance subscore 118 can represent a second percentage (e.g., 20%) of the deliverability score 103, the fraud subscore 121 can represent a third percentage (e.g., 15%) of the deliverability score 103, the latency subscore 124 can represent a fourth percentage (e.g., 25%) of the deliverability score 103, and the engagement subscore 127 can represent a fifth percentage (e.g., 15%) of the deliverability subscore 103. The first, second, third, fourth, and fifth percentages can add up to 100% or to a smaller number when other subscores or factors are weighted into the calculation.

The dashboard 100 can include subscore reasons 130, which can display or illustrate the reason for each of the subscores 115, 118, 121, 124, and 127. The dashboard 100 can include subscore changes 133, which can display or illustrate the changes to each subscore 115, 118, 121, 124, and 127 from the previous period of time (e.g., the previous period of time that the deliverability score 103 was calculated).

The deliverability scoring system can calculate each of the subscores 115, 118, 121, 124, and 127 based on error codes received in response to sending network traffic messages. Once network traffic messages have been sent or queued for sending, the deliverability scoring system can receive an error code associated with each of the network traffic messages. The error codes can include an alphanumeric code associated with an error that occurred before, during, or after transmitting a network traffic message. The error code can represent that the network traffic message failed to be delivered to the destination address or can represent some other error. In some embodiments, each network traffic message can be associated with zero or one error code. In some other embodiments, each network traffic message can be associated with multiple error codes. The deliverability scoring system can sort each of the error codes into a subscore bin associated with each of the subscores 115, 118, 121, 124, and 127. In some embodiments, each possible error code can be sorted into one of the subscore bins, while in other embodiments, each possible error code can be sorted into multiple subscore bins. Each of the subscores 115, 118, 121, 124, and 127 can be calculated based on the error codes included in the associated subscore bin.

The dashboard 100 can include deliverability recommendation option 136. When selected, the deliverability recommendation option 136 can display recommendations for improving each of the subscores 115, 118, 121, 124, and 127. A user can approve of a recommendation and the deliverability scoring system can implement the recommendation to improve the subscores 115, 118, 121, 124, and 127. The deliverability score 103 and the data displayed on the dashboard 100 can be filtered based on use case, account and subaccount, time period, and destination address. Depending on the selected filter, the deliverability scoring system can filter the network traffic messages being used to calculate the subscores 115, 118, 121, 124, and 127 and the deliverability score 103. The dashboard 100 can be updated to display the new subscores 115, 118, 121, 124, and 127 and the deliverability score 103 based on the filtered network traffic messages. For example, the network traffic messages can be filtered based on the use case for the messages, including but not limited to, verifying customers or clients (e.g., verifying the identity of the customer or clients, verifying the account of the customer or client, one-time passwords, two-factor authentication), sending alerts or notifications to customer or clients, sending marketing or promotional materials/messages to customers or clients, or providing customer service to customers or clients. As another example, the network traffic messages can be filtered based on an account or a subaccount. As another example, the network traffic messages can be filtered based on a date range. As another example, the network traffic messages can be filtered based on destination addresses (e.g., country code, area code, carrier code, 1 k prefix, 10 k prefix, phone number). As another example, the network traffic messages can be filtered based on the method of transmission (e.g., SMS, MMS, messaging platform) and sender country (e.g., the location of the user transmitting the message).

Figure 2:
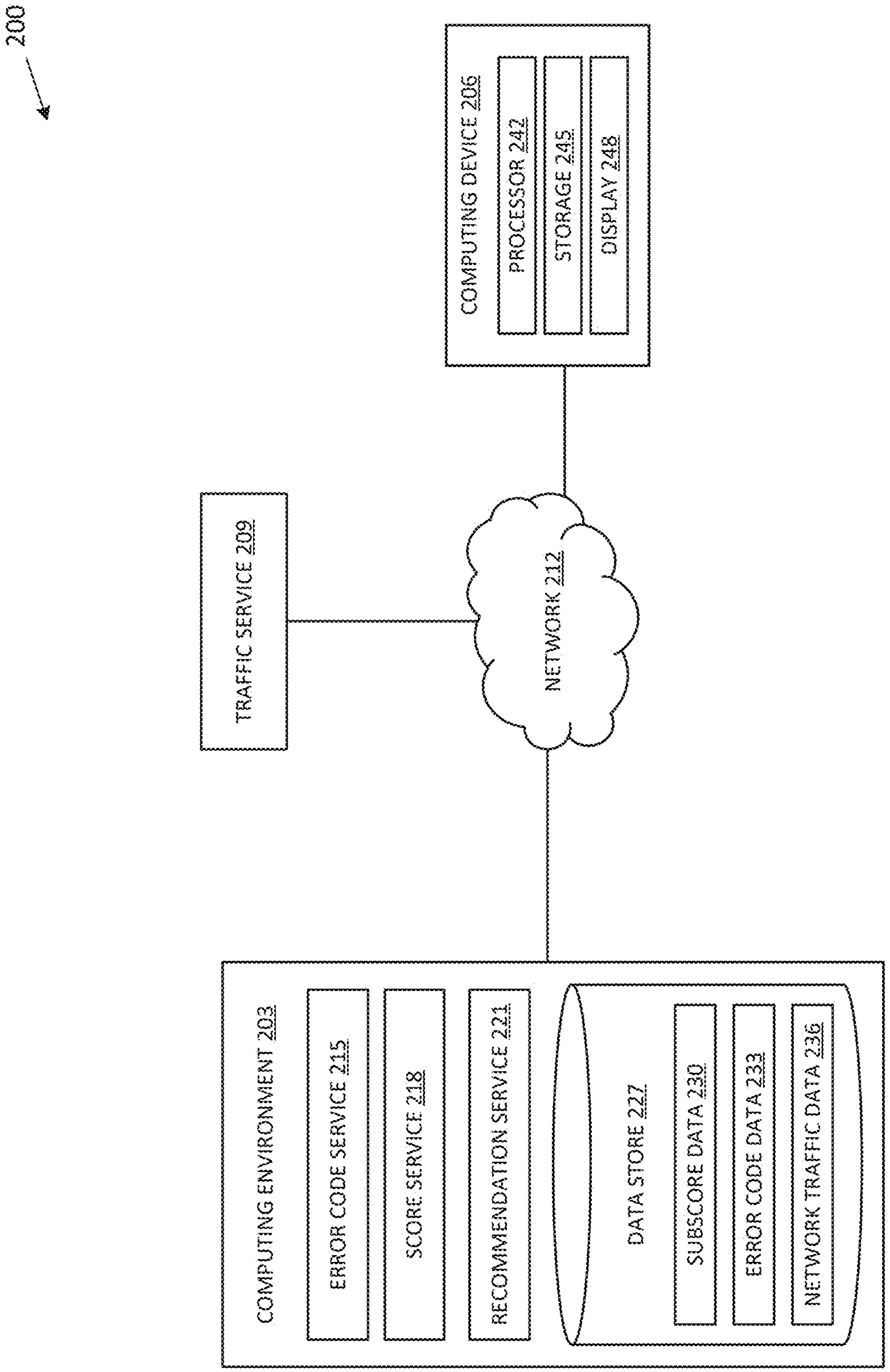
FIG. 2 illustrates an exemplary networked environment for the disclosed system according to various embodiments of the present disclosure.

Referring now to FIG. 2, shown is an exemplary networked environment 200 for the deliverability scoring system according to various embodiments of the present disclosure. As will be understood and appreciated, the exemplary networked environment 200 shown in FIG. 2 represents merely one approach or embodiment of the present system, and other aspects are used according to various embodiments of the present system. Exemplary networked environment 200 can include, but is not limited to, a computing environment 203 connected to one or more computing devices 206 and a traffic service 209 over a network 212.

The elements of the computing environment 203 can be provided via one or more computing devices that may be arranged, for example, in one or more server banks or computer banks or other arrangements. Such computing devices can be located in a single installation or may be distributed among many different geographical locations. For example, the computing environment 203 can include one or more computing devices that together may include a hosted computing resource, a grid computing resource, or any other distributed computing arrangement. In some cases, the computing environment 203 can correspond to an elastic computing resource where the allotted capacity of processing, network, storage, or other computing-related resources may vary over time. Regardless, the computing environment 203 can include one or more processors and memory having instructions stored thereon that, when executed by the one or more processors, cause the computing environment 203 to perform one, some, or all of the actions, methods, steps, or functionalities provided herein.

The computing environment 203 can include an error code service 215, a score service 218, a recommendation service 221, and the data store 227. The error code service 215, the score service 218, and the recommendation service 221 can correspond to one or more software executables that can be executed by the computing environment 203 to perform the functionality described herein. While the error code service 215, the score service 218, and the recommendation service 221 are described as different services, it can be appreciated that the functionality of these services can be implemented in one or more different services executed in the computing environment 203. Various data can be stored in the data store 227, including but not limited to, the subscore data 230, the error code data 233, and the network traffic data 236.

The error code service 215 can assign possible error codes to subscore bins. The possible error codes can represent some or all of the potential error codes that the deliverability scoring system can receive in response to transmitting network traffic messages. The error code service 215 can save the assigned possible error codes in the data store 227 as the error code data 233. The possible error codes can be assigned based on input from the user, the error code data 233, and the network traffic data 236. In some embodiments, some of the possible error codes can be assigned to a specific subscore bin and the remaining, unassigned possible error codes can be assigned to a particular subscore bin.

The error code service 215 can receive actual error codes before, during, and/or after the traffic service 209 transmits the network traffic messages. The error code service 215 can compare the actual error codes to the possible error codes assigned to each subscore bin. If the actual error code matches a possible error code assigned to a particular subscore bin, the error code service 215 can save the match as the error code data 233 such that the actual error code will be used to calculate the subscore associated with the particular subscore bin.

The score service 218 can calculate the deliverability score and the subscores included in the deliverability score calculated for a predetermined period of time. The score service 218 can calculate the deliverability score by summing together the subscores. The score service 218 can calculate a particular subscore by dividing total number of the actual error codes associated with a particular subscore bin by the total number of network traffic messages minus the total number of actual error codes not associated with the particular subscore bin (e.g., associated with a different subscore bin than the particular subscore bin).

In some embodiments, the score service 218 can calculate a performance metric to include in the subscore. The performance metric can include any metric associated with the performance of the network traffic messages. The performance metrics can represent the performance of the network traffic messages regardless of the actual error codes received. The score service 218 can calculate the performance metric based on the subscore data 230 and the network traffic data 236. The score service 218 can weight the performance metric and the subscore based on the actual error codes and add the values together to calculate the subscore including the performance metric.

The score service 218 can distribute (e.g., scaled) each subscore between the minimum score and maximum score. By distributing the subscores between the minimum score and the maximum score, the score service 218 can weigh each subscore so that each subscore is appropriately weighted when calculating the deliverability score. The score service 218 can apply any distribution formula or algorithm capable of distributing the subscore between the minimum score and the maximum score. For example, the score service 218 can apply discrete distribution formulas (e.g., binomial distributions, poisson distributions, geometric distributions) and continuous distributions formulas (e.g., gaussian distributions, exponential distributions, uniform distributions, chi-square distributions, beta distributions, gamma distributions). The score service 218 can save the subscores and the deliverability score as the subscore data 230. The score service 218 can render the deliverability score and the subscores on an online dashboard. For example, the score service 218 can render the deliverability score and the subscores on the dashboard 100 illustrated by FIG. 1.

The recommendation service 221 can present a recommendation for improving each specific subscore. The recommendation service 221 can determine a recommendation that will improve the subscore based on the subscore data 230. The recommendation service 221 can provide a recommendation that, if implemented, can remedy the error codes before, during, or after transmission of the network traffic message. The recommendation service 221 can receive acceptance of the recommendation and perform a remedial action based on the accepted recommendation. The recommendation service 221 can receive the acceptance as user input or by an API request or message. After receiving the acceptance, the recommendation service 221 can perform the remedial action based on the accepted recommendation (e.g., the remedial action can include the recommended action from the recommendation).

According to various embodiments, the computing device 206 can include any device capable of accessing network 212 including, but not limited to, a computer, smartphone, tablets, or other device. The computing device 206 can include a processor 242 and storage 245. The computing device 206 can include a display 248 on which various user interfaces can be rendered to allow users to configure, monitor, control, and command various functions of networked environment 200. In various embodiments, computing device 206 can include multiple computing devices. Regardless, the computing device 206 can include one or more processors and memory having instructions stored thereon that, when executed by the one or more processors, cause the computing device 206 to perform one, some, or all of the actions, methods, steps, or functionalities provided herein.

The traffic service 209 can transmit network traffic messages, including SMS, MMS, and any other type of message sent on a messaging platform (e.g., a social media platform). The traffic service 209 can transmit the network traffic messages to a destination address, such as a phone number, email address, or handle associated with a messaging platform. The traffic service 209 can store the network traffic messages as the network traffic data 236. The traffic service 209 can transmit the network traffic messages for any purpose, including but not limited to, verifying customers or clients associated with the user (e.g., verifying the identity of the customer or clients, verifying the account of the customer or client, one-time passwords, two-factor authentication), sending alerts or notifications to customer or clients associated with the user, sending marketing or promotional materials/messages to customers or clients associated with the user, or providing customer service to customers or clients associated with the user.

The network 212 includes, for example, the Internet, intranets, extranets, wide area networks (WANs), local area networks (LANs), wired networks, wireless networks, or other suitable networks, etc., or any combination of two or more such networks.

Figure 3:
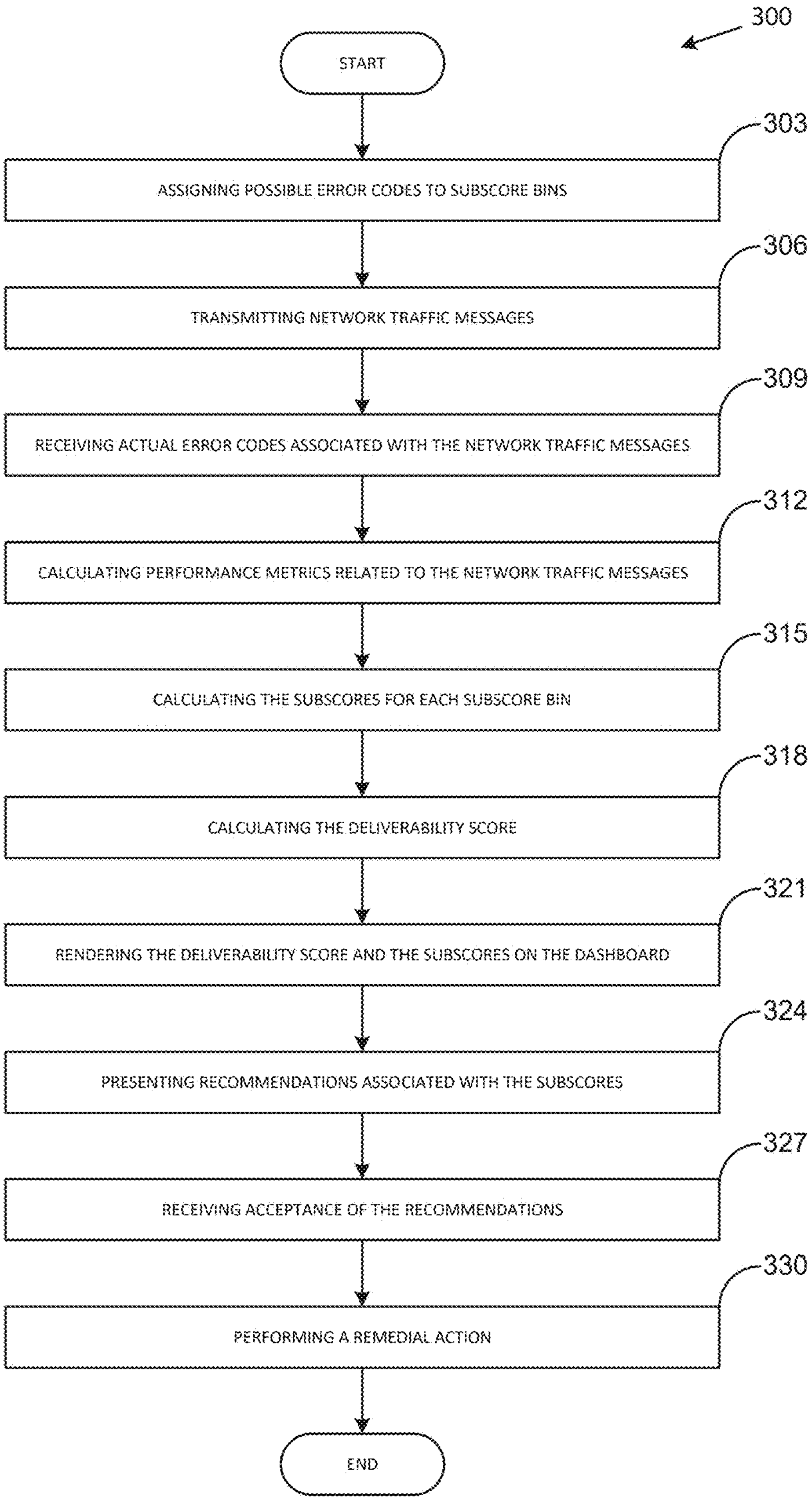
FIG. 3 illustrates an exemplary overall process for the disclosed system according to various embodiments of the present disclosure.

Referring now to FIG. 3, shown is an exemplary, high-level overview process 300 according to various embodiments of the present disclosure. As will be understood by one having ordinary skill in the art, the steps and processes shown in FIGS. 3-6 may operate concurrently and continuously, are generally asynchronous and independent, can be performed in part or in whole by a combination of one or more of the computing environment 203, the computing device 206, and the traffic service 209 and are not necessarily performed in the order shown and various steps can be executed linearly or in parallel. Process 300 can be performed entirely, partially, or in coordination with the traffic service 209, error code service 215, the score service 218, and the recommendation service 221.

At step 303, the process 300 can include assigning possible error codes to subscore bins. The error code service 215 can assign possible error codes to subscore bins. The possible error codes can represent some or all of the potential error codes that the deliverability scoring system can receive in response to transmitting network traffic messages. The possible error codes can be saved in the data store 227 as the error code data 233. The subscore bins can include categories of error codes associated with the subscores (e.g., the sent rate subscore, the compliance subscore, the fraud subscore, the latency subscore, the engagement subscore). Each of the possible error codes can be assigned to one of the subscore bins. In some embodiments, a possible error code can be assigned to multiple subscore bins. The possible error codes can be assigned based on input from the user, the error code data 233, and the network traffic data 236. In some embodiments, some of the possible error codes can be assigned to a specific subscore bin and the remaining, unassigned possible error codes can be assigned to the sent rate subscore bin.

As will be understood, as the deliverability scoring system receives actual error codes, the actual error codes can be compared to the possible error codes assigned to each subscore bin. When the actual error code matches with a possible error code assigned to a specific subscore bin, the actual error code will be used to calculate the subscore with the associated subscore bin. The possible error codes can represent which actual error codes can be used for calculating a particular subscore.

At step 306, the process 300 can include transmitting network traffic messages. The traffic service 209 can transmit the network traffic messages. The network traffic message can include SMS, MMS, and any other type of message sent on a messaging platform (e.g., a social media platform). The network traffic message can be transmitted to a destination address, such as a phone number, email address, or handle associated with a messaging platform. As an example, the network traffic messages can be transmitted in response to a request for verification (e.g., a recipient of the network traffic messages transmits a request for verification to the user of the deliverability scoring system). As another example, the network traffic messages can be transmitted in response to a request from a user of the deliverability scoring system. As another example, the network traffic message can be transmitted in response to the traffic service 209 receiving an API request or message from the user. As another example, the network traffic message can be transmitted in response to the network traffic message being queued. As another example, the network traffic message can be transmitted in response to the traffic service 209 receiving a network traffic message. The network traffic messages can be stored in the data store 227 as the network traffic data 236.

At step 309, the process 300 can include receiving actual error codes associated with the network traffic messages. The error code service 215 can receive actual error codes associated with the network traffic messages. Zero or one actual error code can be received for each network traffic message transmitted. In some embodiments, multiple actual error codes can be received for each network traffic message transmitted. The actual error codes can be received in response to an error occurring before, during, or after the traffic service 209 transmits the network traffic messages. The possible error codes can include or overlap with some or all of the actual error codes. In other words, some or all of the possible error codes can be received as actual error codes. The same error code can be received multiple times, each associated with a different or the same network traffic message.

The error code service 215 can compare the actual error codes to the possible error codes assigned to each of the subscore bins. If an actual error code matches a possible error code assigned to a particular subscore bin, then the actual error code can be used to calculate the subscore associated with the particular subscore bin. The actual error codes can be saved in the data store 227 as the error code data 233.

At step 312, the process 300 can include calculating a performance metric related to the network traffic messages. The score service 218 can calculate a performance metric related to the network traffic messages. The performance metric can include any metric associated with the performance of the network traffic messages. The performance metrics can represent the performance of the network traffic messages regardless of the actual error codes received. As will be understood, in some embodiments, the performance metrics can be calculated without considering the actual error codes received. The performance metrics can be calculated based on the subscore data 230 and the network traffic data 236. The performance metrics can be calculated based on the network traffic messages transmitted during a predetermined period of time (e.g., 1 hour, 1 day, 1 week, 1 month, 1 year).

Each subscore can include an associated performance metric. As an example, the sent rate subscore can include a successful sent rate of the network traffic messages. As another example, the compliance subscore can include a compliance rate of the network traffic messages. As another example, the fraud score can include a fraud rate of the network traffic messages. As another example, the latency score can include a time scale score of the network traffic messages, which will be discussed further with reference to FIG. 4. As another example, the engagement score can include a message outcome score of the network traffic messages, which will be discussed further with reference to FIG. 5. As another example, the performance score can include a benchmark associated with each subscore. The benchmark can be determined by applying a machine learning algorithm to the subscore data 230 and the network traffic data 236, and will be discussed further with reference to FIG. 6.

At step 315, the process 300 can include calculating a subscore for each subscore bin. The score service 218 can calculate a subscore for each subscore bin. The subscore can be calculated for a predetermined period of time (e.g., 1 hour, 1 day, 1 week, 1 month, 1 year). For example, the subscore can be calculated based on all of the network traffic messages transmitted during the predetermined period of time. The subscore for each subscore bin can be calculated as follow:

$$\text{subscore}_i = \frac{\sum \text{errors}_i}{\sum \text{messages} - \left(\sum \text{errors}_{all} - \sum \text{errors}_i\right)}$$

where $\text{subscore}_i$ is the particular subscore for a particular subscore bin, $\Sigma\text{errors}_i$ is the sum of all the messages with the actual error codes associated with the particular subscore bin, $\Sigma\text{errors}_{all}$ is the sum of all the messages with actual error codes received for all of the subscore bins, and Σmessages is the sum of all the network traffic messages transmitted during the predetermined period of time (e.g., 1 hour, 1 day, 1 week, 1 month, 1 year). As will be understood, the $\text{subscore}_i$ will be a number between 0 and 1.

In some embodiments, the subscores can include the performance metrics. The $\text{subscore}_i$ and the performance metric for the particular subscore bin can be weighted and summed to calculate the subscore. The subscore, including the performance metric, can be calculated as follows:

$$\text{subscore}_{pm} = (w_1 \times \text{subscore}_i) + (w_2 \times \text{performance metric}_i)$$

where the $\text{subscore}_{pm}$ is the subscore including the performance metric, performance $\text{metric}_i$ is the performance metric associated with the subscore, and $w_1$ and $w_2$ are the weights applied to the to $\text{subscores}_i$ and performance $\text{metric}_i$. As will be understood, the $w_1$ and $w_2$ can be any value between 0 and 1 and $w_1$ and $w_2$ can add up to 1. The weighting, $w_1$ and $w_2$, can be determined based on the subscore data 230, the error code data 233, and the network traffic data 236 or user input.

A distribution formula or algorithm can be applied to each of the subscores, which in some embodiments, can include the performance metric. The distribution formula or algorithm can include any type of distribution formula or algorithm capable of distributing the subscores between a minimum and maximum, including but not limited to, discrete distribution formulas (e.g., binomial distributions, poisson distributions, geometric distributions) and continuous distributions formulas (e.g., gaussian distributions, exponential distributions, uniform distributions, chi-square distributions, beta distributions, gamma distributions). The particular distribution formula can distribute the particular subscores between the minimum score and maximum score. Distributing the particular subscores between the minimum score and the maximum score can apply a weighing to each of the subscores so that each of the subscores can be appropriately weighted when calculating the deliverability score. As an illustrative non-limiting example, the sent rate subscore can include a minimum score of 5 and a maximum score of 25, the compliance subscore can include a minimum score of 4 and a maximum score of 20, the fraud subscore can include a minimum score of 3 and a maximum score of 15, the latency subscore can include a minimum score of 5 and a maximum score of 25, and the engagement subscore can include a minimum score of 3 and a maximum score of 15. As will be understood, the minimum score and the maximum score can be any number, including zero or greater and can determined based on the weighting of the subscores. Any weighting can be applied to the subscores. In some embodiments, the weighting of the subscores can be determined based on the subscore data 230, the error code data 233, and the network traffic data 236. In some embodiments, the weighting of a particular subscores can be determined based on the aspect or performance of the network traffic messages being measured by the particular subscore.

At step 318, the process 300 can include calculating a deliverability score. The score service 218 can calculate the deliverability score. The deliverability score can be calculated by adding or summing together all of the subscores. The deliverability score can represent the performance of the network traffic messages transmitted during the predetermined period of time. The deliverability score can be associated with a deliverability score category. The deliverability score categories can include, but are not limited to, bad, poor, fair, good, and excellent categories. Each category can include a range of deliverability scores that fall within that category. For example and illustrative purposes, the bad category can include deliverability scores between 20 and 39, the poor category can include deliverability scores between 40 and 55, the fair category can include deliverability scores between 56 and 74, the good category can include deliverability scores between 75 and 90, and the excellent category can include deliverability scores between 91 and 100.

At step 321, the process 300 can include rendering the deliverability score and the subscores on a dashboard. The score service 218 can render the deliverability score and the subscores on a dashboard. The deliverability score can be displayed as a number and represented visually by a gauge or some other visual display (e.g., bar, slider, graph). The dashboard can display the changes to the deliverability score over time. The dashboard can include a line graph showing the deliverability score and subscores over time. The dashboard can include trends related to the deliverability score and the subscores. The deliverability score and the subscores can be rendered on a dashboard as discussed with reference to FIG. 1. The dashboard can be accessible via web browser or native application. The deliverability scoring system can transmit alerts to the user if the deliverability score falls below or exceeds a predetermined threshold deliverability score or a predetermined change in deliverability score.

At step 324, the process 300 can include presenting recommendations associated with the subscores. The recommendation service 221 can present recommendations associated with the subscores. The recommendation service 221 can present a specific recommendation for improving a specific subscore. For example, the recommendation service 221 can present a recommendation for addressing the actual error codes associated with the particular subscore bin, including but not limited to, addressing and remedying the error prior to transmitting the network traffic message, addressing and remedying errors related to undeliverable or blocked destination addresses (e.g., increasing the sent rate subscore), and addressing and remedying errors related to failing to comply with policies (e.g., increasing the compliance score). As another example, the recommendation service 221 can present a recommendation for assessing the risk of fraud and blocking network traffic messages if the risk of fraud is high (e.g., improving the fraud subscore). As another example, the recommendation service 221 can present a recommendation improving or optimizing network traffic (e.g., decreasing the latency subscore) or improving engagement (e.g., improving the engagement subscore). In some embodiments, presenting a recommendation can include presenting a recommended product related to the deliverability scoring system.

At step 327, the process 300 can include receiving acceptance of the recommendations. The recommendation service 221 can receive acceptance of the recommendations. Receiving acceptance of the recommendation can include receiving input from a user or receiving an API request or message. Receiving acceptance of the recommendation can indicate that the recommendation should be performed as a remedial action to improve the subscore. At step 330, the process 300 can include performing a remedial action. The recommendation service 221 can perform a remedial action. The remedial action can be performed in response to receiving the acceptance of the recommendation. The remedial action can include performing the action described in the recommendation. Once the remedial action has been performed, the subscore associated with the recommendation can improve, which can improve the deliverability score when the deliverability score is recalculated. As will be understood, the deliverability score can be recalculated each instance the predetermined period of time elapsed. For example, if the predetermined period of time is a week, the deliverability score can be recalculated each week.

Figure 4:
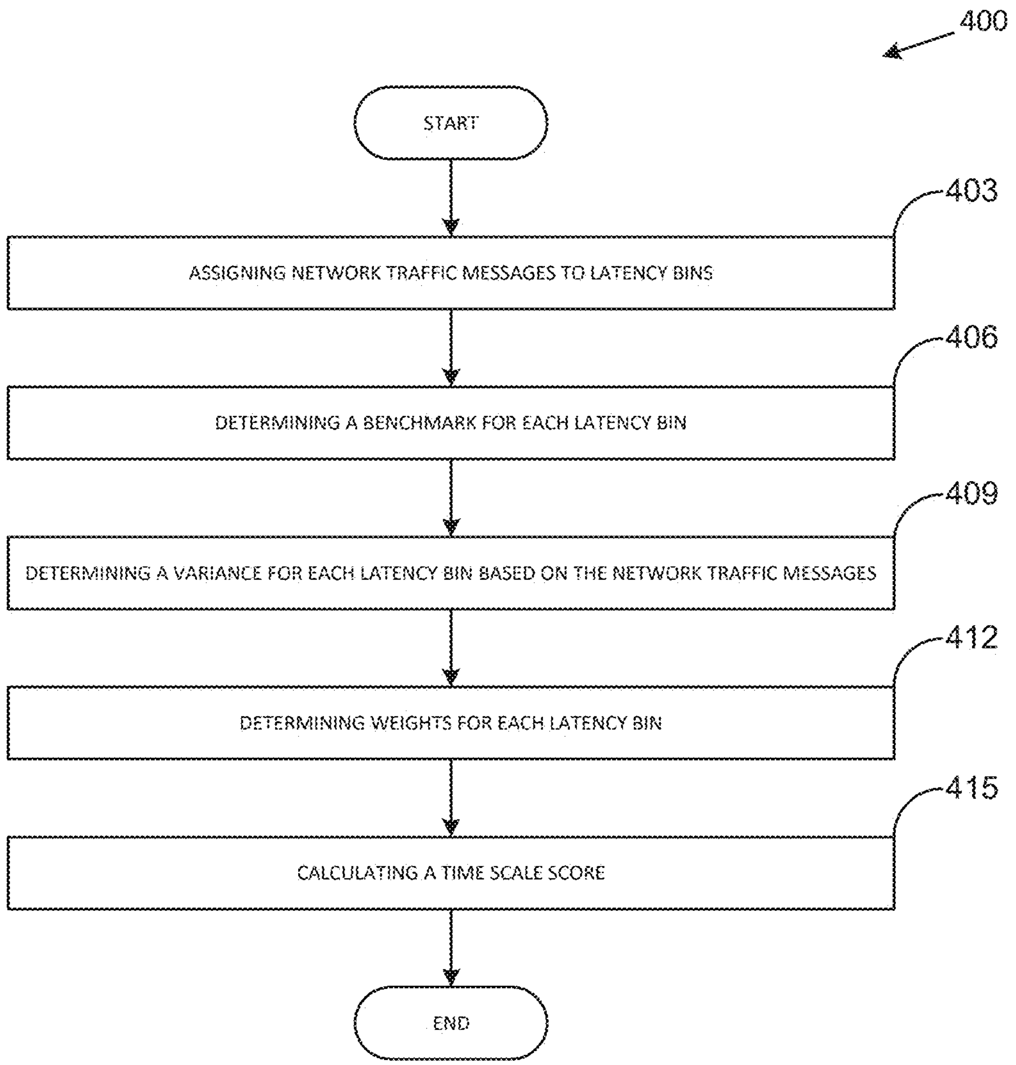
FIG. 4 illustrates an exemplary time scale score process for the disclosed system according to various embodiments of the present disclosure.

Referring now to FIG. 4, shown is an exemplary, time scale score process 400 according to various embodiments of the present disclosure. As will be understood by one having ordinary skill in the art, the step 312 from the process 300 can include the process 400. Process 400 can be performed entirely, partially, or in coordination with the traffic service 209, error code service 215, the score service 218, and the recommendation service 221.

At step 403, the process 400 can include assigning network traffic messages to latency bins. The score service 218 can assign the network traffic messages to a latency bins. The latency bins can represent the speed or time at which different types of network traffic messages are expected to be delivered to the destination address. The latency bins can include any number of latency bins (e.g., 2, 3, 4, 5). For example and illustrative purposes, the latency bins can include 3 bins, a high priority bins, a medium priority bin, and a low priority bin. The types of network traffic messages assigned to the high priority bin can be expected to be delivered to the destination address in a short period of time, while the types of network traffic messages assigned to the low priority bin can be expected to delivered to the destination address in a longer period of time.

The types of network traffic messages can be based on the purpose for transmitting the network traffic message. For example, the types of network traffic messages can include verification network traffic messages, alerts or notifications network traffic messages, marketing or promotional network traffic messages, and customer service network traffic messages. The types of network traffic messages can be assigned to the latency bins based on the time-sensitive nature of the types of network traffic messages. As an example, verification network traffic messages can be assigned to the high priority bin because verification network traffic messages can be highly time-sensitive. As another example, the marketing or promotional network traffic messages can be assigned to the low priority bin because the marketing or promotional network traffic messages may not be time-sensitive. The types of network traffic messages can be assigned based on the subscore data 230, the error code data 233, and the network traffic data 236 or based on user input or preference.

At step 406, the process 400 can include determining a benchmark for each latency bin. The score service 218 can determine a benchmark for each latency bin. The particular benchmark can represent the expected time for the network traffic messages assigned to the particular latency bin to be delivered to the destination address. The benchmark can be determined based on the historical data saved as the network traffic data 236. For example, the particular benchmark can be determined by calculating the mean or median time for the particular type of network traffic messages saved in network traffic data 236 to be delivered. As another example, the particular benchmark can be determined by calculating the percentile, quartile, or z-score for the particular type of network traffic messaged saved in the network traffic data 236 to be delivered. As another example, the particular benchmark can be determined based on a service level agreement or other type of agreement with the user (e.g., the agreement includes the particular benchmark). As another example, the particular benchmark can be determined by applying a machine learning algorithm or model to the historical data saved as the network traffic data 236. The machine learning algorithm or model can be any machine learning algorithm or model or combination thereof, including but not limited to nearest neighbor, support vector machines, gradient boosting, neural networks, logistic regression, linear regression, decision trees, random forest, Naive Bayes, k-means clustering, time series regression, pointwise prediction, stepwise regression, Gaussian models, hidden Markov models, ensemble learning models, means-shift clustering, and Bayesian models.

At step 409, the process 400 can include determining a variance for each latency bin based on the network traffic messages. The score service 218 can determine a variance for each latency bin based on the network traffic messages. The variance can include the difference between the particular benchmark and the types of network traffic messages assigned to the latency bin and transmitted during the predetermined time period. Calculating the variance can include calculating a difference, a statistical variance, or the standard deviation between the particular benchmark and the types of network traffic messages assigned to the particular latency bin and transmitted during the predetermined time period.

At step 412, the process 400 can include determining a weight for each latency bin. The score service 218 can determine a weight for each latency bin. Determining a weight for each latency bin can include determining the weighing for the variance of each latency bin. The weighting for each variance can be determined by calculating the percentage of network traffic messages assigned to the particular latency bin and transmitted during the predetermined period of time compared to the total number of network traffic messages transmitted during the predetermined period of time. As will be understood, the sum of all the weightings applied to each latency bin can add up to 1.

At step 415, the process 400 can include calculating a time scale score. The score service 218 can calculate a time scale score. As will be understood, the time scale score can be a type of performance metric included in the latency subscore. The time scale score can be calculated by multiplying each of the variances for each of the latency bins by each of the weightings and then summing up the resulting values. As an illustrative example, if there are 3 latency bins, including a high priority bin, a medium priority bin, and a low priority bin, the time scale score can be calculated as follows:

$$\text{time scale score} = (w_1 \times v_1) + (w_2 \times v_2) + (w_3 \times v_3)$$

and $$1 = w_1 + w_2 + w_3$$

where $v_1$ is the variance of the high priority latency bin and $w_1$ is the weighting of the variance of the high priority latency bin, $v_2$ is the variance of the medium priority latency bin and $w_2$ is the weighting of the variance of the medium priority latency bin, and $v_3$ is the variance of the low priority latency bin and $w_3$ is the weighting of the variance of the low priority latency bin. The weighting, $w_1$, $w_2$, and $w_3$ can be determined based on the subscore data 230, the error code data 233, and the network traffic data 236 or user input.

Figure 5:
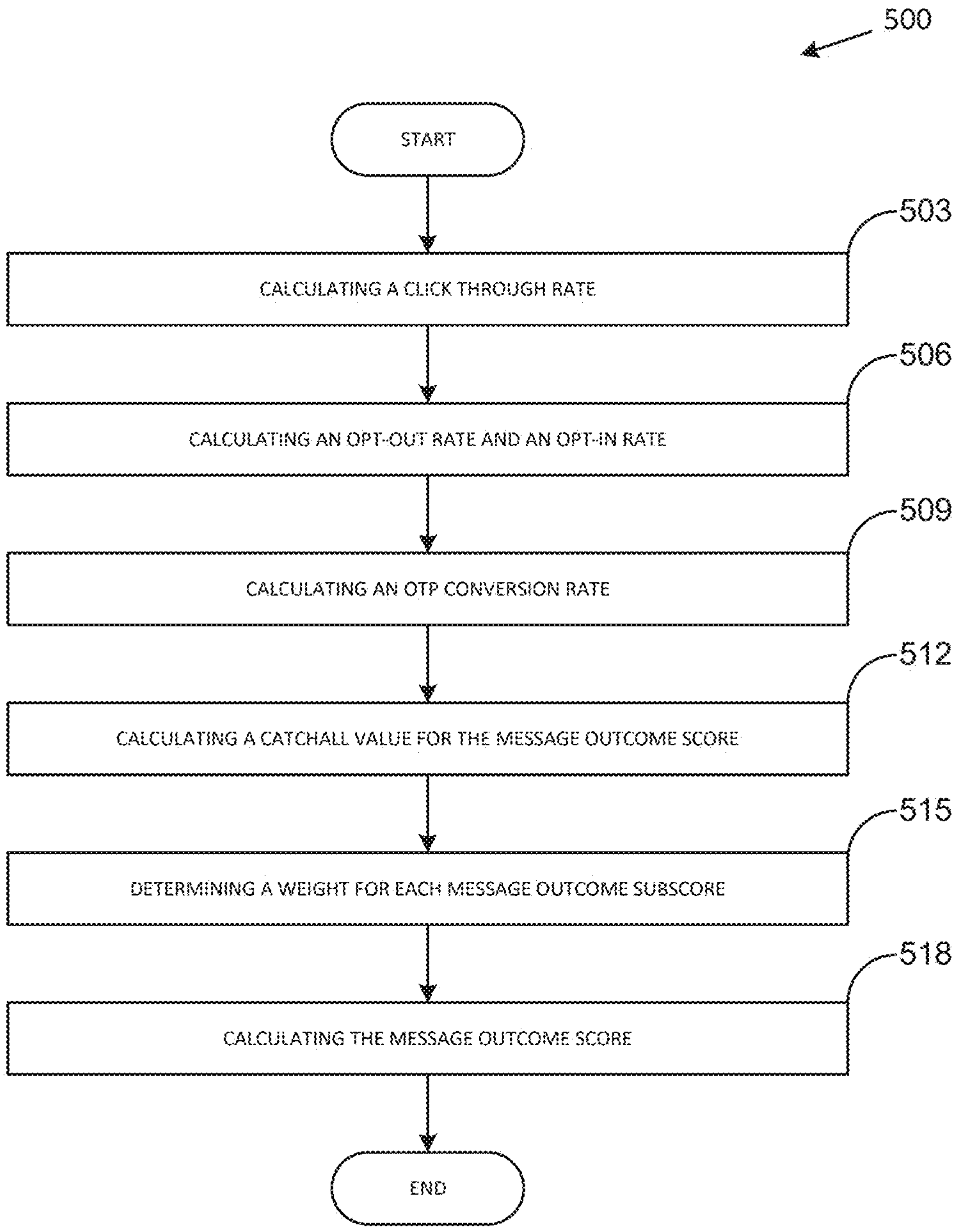
FIG. 5 illustrates an exemplary message outcome score process according to various embodiments of the present disclosure.

Referring now to FIG. 5, shown is an exemplary, message outcome score process 500 according to various embodiments of the present disclosure. As will be understood by one having ordinary skill in the art, the step 312 from the process 300 can include the process 500. Process 500 can be performed entirely, partially, or in coordination with the traffic service 209, error code service 215, the score service 218, and the recommendation service 221.

At step 503, the process 500 can include calculating a click through rate. The score service 218 can calculate a click through rate. The network traffic messages can include a link (e.g., a HTML hyperlink, a link to a native application). The score service 218 can calculate the percentage of links accessed from the network traffic messages transmitted during the predetermined period of time. The click through rate can be calculated based on all of the network traffic messages transmitted during the predetermined period of time, based on the successfully delivered network traffic messages transmitted during the predetermined period of time, or based on the number of network traffic messages transmitted during the predetermined period of time containing a link. The click through rate can be any number between 0 and 1. The click through rate can be saved in the data store as the network traffic data 236.

At step 506, the process 500 can include calculating an opt-out rate and an opt-in rate. The score service 218 can calculate an opt-out rate and an opt-in rate. The opt-out rate can be calculated by determining the percentage of recipients who opted out of receiving network traffic messages (e.g., recipients unsubscribed from receiving network traffic messages). The opt-in rate can be calculated by determining the percentage of recipients who opted into receiving network traffic messages (e.g., recipients subscribed to receiving network traffic messages). The opt-out rate and the opt-in rate can be based on all of the network traffic messages transmitted during the predetermined period of time or based on the successfully delivered network traffic messages transmitted during the predetermined period of time. The opt-out and opt-in rate can be any number between 0 and 1. The opt-out and opt-in rate can be saved in the data store as the network traffic data 236.

At step 509, the process 500 can include calculating a one-time password conversion rate. The score service 218 can calculate a one-time password conversion rate. The one-time password conversion rate can be calculated by determining the percentage of one-time passwords used by recipients of the network traffic messages. In some embodiments, the one-time password conversion rate can be calculated by determining the percentage of two-factor authentications used by recipients of the network traffic messages. The opt-out rate and the opt-in rate can be based on all of the network traffic messages transmitted during the predetermined period of time, based on the successfully delivered network traffic messages transmitted during the predetermined period of time, or based on the number of network traffic messages transmitted during the predetermined period of time containing a one-time password or two-factor authentication. The one-time password conversion rate can be any number between 0 and 1. The one-time password conversion rate can be saved in the data store as the network traffic data 236.

At step 512, the process 500 can include calculating a catchall value. The score service 218 can calculate a catchall value. The catchall value can be calculated by summing together the click through rate, the opt-out rate, and the one-time conversion rate and subtracting the resulting value from 1. The catchall value can be any number between 0 and 1. The catchall value can be saved in the data store as the network traffic data 236.

At step 515, the process 500 can include determining a weight for each message outcome subscore (e.g., the click through rate, the opt-out rate, the one-time conversion rate, the catchall value). The score service 218 can determine a weight for each message outcome subscore. Any weighting can be applied to the message outcome subscores. In some embodiments, the weighting of the subscores can be determined based on the subscore data 230, the error code data 233, and the network traffic data 236 or based on user input. As will be understood, the sum of all the weightings applied to each message outcome subscore can add up to 1.

At step 518, the process 500 can include calculating a message outcome score. The score service 218 can calculate a message outcome score. As will be understood, the message outcome score can be a type of performance metric included in the engagement subscore. The message outcome score can be calculated by multiplying each of the message outcome subscores (e.g., the click through rate, the opt-out rate, the one-time conversion rate, the catchall value) by each of the weightings and then summing up the resulting values. As an illustrative example, the message outcome score can be calculated as follows:

$$\text{message outcome score} = (w_1 \times \text{click through}) + (w_2 \times \text{optout}) + (w_3 \times OTP) + (w_4 \times \text{catchall})$$

and $$1 = w_1 + w_2 + w_3 + w_4$$

where click through is the click through rate and $w_1$ is the weighting of the variance of the click through rate, optout is the opt-out rate and $w_2$ is the weighting of the opt-out rate, OTP is the one-time password conversion rate and $w_3$ is weighting of the the one-time password conversion rate, and catchall is the catchall value and $w_4$ is weighting of the catchall value. The weighting, $w_1$, $w_2$, $w_3$, and we can be determined based on the subscore data 230, the error code data 233, and the network traffic data 236 or user input.

Figure 6:
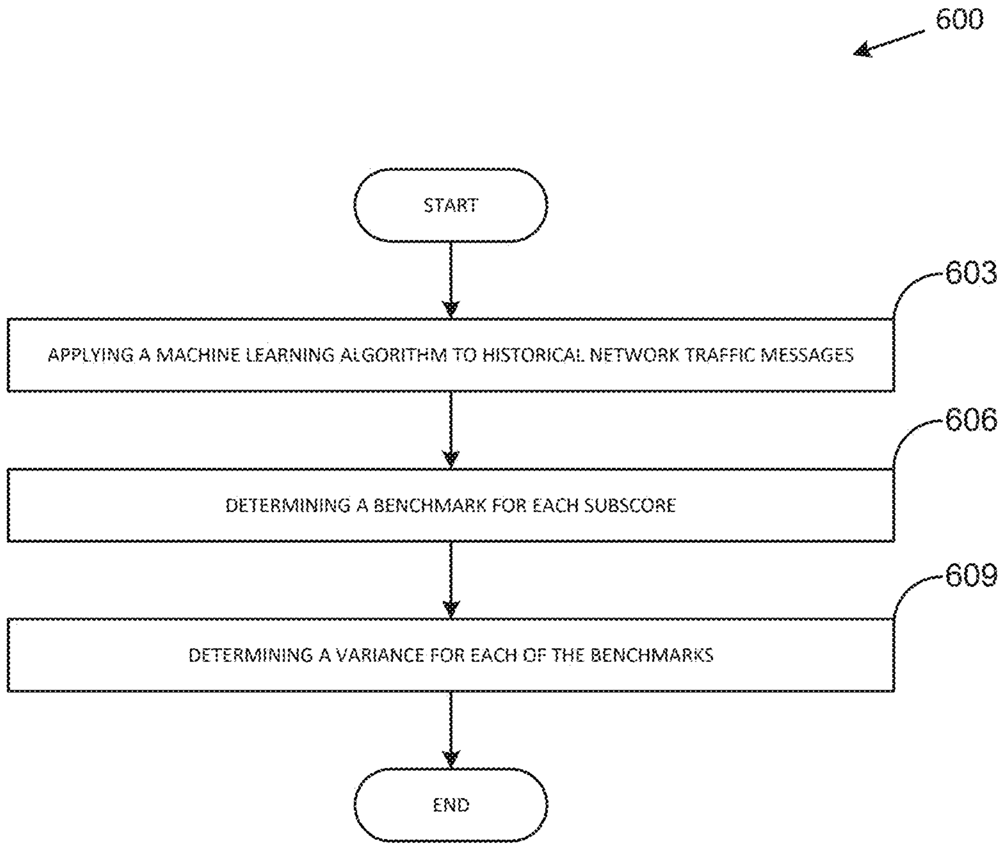
FIG. 6 illustrates an exemplary performance metric score process according to various embodiments of the present disclosure.

Referring now to FIG. 6, shown is an exemplary, performance metric score process 600 according to various embodiments of the present disclosure. As will be understood by one having ordinary skill in the art, the step 312 from the process 300 can include the process 600. Process 600 can be performed entirely, partially, or in coordination with the traffic service 209, error code service 215, the score service 218, and the recommendation service 221.

At step 603, the process 600 can include applying a machine learning algorithm to the historical network traffic messages. The score service 218 can apply the machine learning algorithm to the historical network traffic messages. The historical network traffic messages can include the historical network traffic messages saved in the network traffic data 236. The machine learning algorithm or model can be any machine learning algorithm or model or combination thereof, including but not limited to nearest neighbor, support vector machines, gradient boosting, neural networks, logistic regression, linear regression, decision trees, random forest, Naive Bayes, k-means clustering, time series regression, pointwise prediction, stepwise regression, Gaussian models, hidden Markov models, ensemble learning models, means-shift clustering, and Bayesian models. By applying the machine learning algorithm to the historical network traffic messages, the score service 218 can determine a benchmark for each subscore.

At step 606, the process 600 can include determining a benchmark for each subscore. The score service 218 can determine a benchmark for each subscore. The benchmark can represent the expected performance associated with each of the subscores. As an example, the sent rate subscore can include a successful sent rate of the network traffic messages. As another example, the compliance subscore can include a compliance rate of the network traffic messages. As another example, the fraud score can include a fraud rate of the network traffic messages.

At step 609, the process 600 can include determining a variance for each benchmark. The score service 218 can determine the variance for each benchmark. The performance metric, discussed with reference to step 312, can include the variance. The variance can include the difference between the particular benchmark and the network traffic messages transmitted during the predetermined period of time. Calculating the variance can include calculating a difference, a statistical variance, or the standard deviation between the particular benchmark and the types of network traffic messages transmitted during the predetermined time period.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LAN (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein. While thresholds are discussed herein as being met when the threshold is exceeded, the system may determine a threshold is met when a value meets or exceeds the threshold.

Clause 1. A method, comprising: assigning, via one of one or more computing devices, a plurality of possible codes to a plurality of subscore bins; receiving, via one of the one or more computing devices, a plurality of actual codes associated with a plurality of network traffic messages, wherein the plurality of possible codes comprises the plurality of actual codes; calculating, via one of the one or more computing devices, a deliverability score based on the plurality of possible codes assigned to the plurality of subscore bins and the plurality of actual codes; and rendering, via one of the one or more computing devices, the deliverability score on an online dashboard.

Clause 2. The method of clause 1 or any other clause herein, further comprising: transmitting, via one of the one or more computing devices, the plurality of network traffic messages; presenting, via one of the one or more computing devices, one or more recommendations, wherein the one or more recommendations are associated with at least one of the subscores; receiving, via one of the one or more computing devices, an acceptance of the one or more recommendations; and in response to receiving the acceptance of the one or more recommendations, performing, via one of the one or more computing devices, a remedial action.

Clause 3. The method of clause 1 or any other clause herein, further comprising: calculating, via one of the one or more computing devices, a subscore for each of the plurality of subscore bins based on the plurality of actual codes, wherein the plurality of subscore bins comprises a sent rate bin, a compliance bin, a fraud bin, a latency bin, and an engagement bin.

Clause 4. The method of clause 1 or any other clause herein, wherein calculating the subscore for each of the plurality of subscore bins is further based on one or more performance metrics associated with the plurality of network traffic messages.

Clause 5. The method of clause 4 or any other clause herein, wherein the one or more performance metrics are calculated by: applying, via one of the one or more computing devices, a machine learning algorithm to a plurality of historical network traffic messages; determining, via one of the one or more computing devices, one or more benchmarks associated with at least one of the plurality of subscore bins; and determining, via one of the one or more computing devices, a variance from the one or more benchmarks based on the plurality of network traffic messages.

Clause 6. The method of clause 1 or any other clause herein, wherein the deliverability score and the subscores for each of the plurality of subscore bins is configured to be filtered based on the plurality of network traffic messages.

Clause 7. The method of clause 1 or any other clause herein, wherein the subscores for each of the plurality of subscore bins and the deliverability score are calculated based on the plurality of network traffic messages transmitted during a predetermined time period.

Clause 8. A system, comprising: a memory device; and at least one computing device communicatively coupled to the memory device, the at least one computing device being configured to: assign a plurality of possible codes to a plurality of subscore bins; receive a plurality of actual codes associated with a plurality of network traffic messages, wherein the plurality of possible codes comprises the plurality of actual codes; calculate a deliverability score based on the plurality of possible codes assigned to the plurality of subscore bins and the plurality of actual codes; and render the deliverability score on an online dashboard.

Clause 9. The system of clause 8 or any other clause herein, wherein the at least one computing device is further configured to: transmitting, via one of the one or more computing devices, the plurality of network traffic messages; present one or more recommendations, wherein the one or more recommendations are associated with at least one of the subscores; receive an acceptance of the one or more recommendations; and in response to receiving the acceptance of the one or more recommendations, perform a remedial action.

Clause 10. The system of clause 8 or any other clause herein, further comprising: calculating, via one of the one or more computing devices, a subscore for each of the plurality of subscore bins based on the plurality of actual codes, wherein the plurality of subscore bins comprises a sent rate bin, a compliance bin, a fraud bin, a latency bin, and an engagement bin.

Clause 11. The system of clause 8 or any other clause herein, wherein calculating the subscore for each of the plurality of subscore bins is further based on one or more performance metrics associated with the plurality of network traffic messages.

Clause 12. The system of clause 11 or any other clause herein, wherein the at least one computing device is configured to calculate the one or more performance metrics by: applying a machine learning algorithm to a plurality of historical network traffic messages; determine one or more benchmarks associated with at least one of the plurality of subscore bins; and determine a variance from the one or more benchmarks based on the plurality of network traffic messages.

Clause 13. The system of clause 8 or any other clause herein, wherein the deliverability score and the subscores for each of the plurality of subscore bins is configured to be filtered based on the plurality of network traffic messages.

Clause 14. The system of clause 8 or any other clause herein, wherein the subscores for each of the plurality of subscore bins and the deliverability score are calculated based on the plurality of network traffic messages transmitted during a predetermined time period.

Clause 15. A non-transitory computer-readable medium embodying a program that, when executed by at least one computing device, cause the at least one computing device to: assign a plurality of possible codes to a plurality of subscore bins; receive a plurality of actual codes associated with a plurality of network traffic messages, wherein the plurality of possible codes comprises the plurality of actual codes; calculate a deliverability score based on the plurality of possible codes assigned to the plurality of subscore bins and the plurality of actual codes; and render the deliverability scores on an online dashboard.

Clause 16. The non-transitory computer-readable medium of clause 15 or any other clause herein, wherein the program further causes the at least one computing device to: transmitting, via one of the one or more computing devices, the plurality of network traffic messages; present one or more recommendations, wherein the one or more recommendations are associated with at least one of the subscores; receive an acceptance of the one or more recommendations; and in response to receiving the acceptance of the one or more recommendations, perform a remedial action.

Clause 17. The non-transitory computer-readable medium of clause 15 or any other clause herein, further comprising: calculating a subscore for each of the plurality of subscore bins based on the plurality of actual codes, wherein the plurality of subscore bins comprises a sent rate bin, a compliance bin, a fraud bin, a latency bin, and an engagement bin.

Clause 18. The non-transitory computer-readable medium of clause 15 or any other clause herein, wherein calculating the subscore for each of the plurality of subscore bins is further based on one or more performance metrics associated with the plurality of network traffic messages.

Clause 19. The non-transitory computer-readable medium of clause 18 or any other clause herein, wherein the program further causes the at least one computing device to calculate the one or more performance metrics by: applying a machine learning algorithm to a plurality of historical network traffic messages; determine one or more benchmarks associated with at least one of the plurality of subscore bins; and determine a variance from the one or more benchmarks based on the plurality of network traffic messages.

Clause 20. The non-transitory computer-readable medium of clause 15 or any other clause herein, wherein the deliverability score and the subscores for each of the plurality of subscore bins is configured to be filtered based on the plurality of network traffic messages.

These and other aspects, features, and benefits of the claims will become apparent from the detailed written description of the aforementioned aspects taken in conjunction with the accompanying drawings, although variations and modifications thereto may be effected without departing from the spirit and scope of the novel concepts of the disclosure.

What is claimed is:

1. A method, comprising:

assigning, by at least one hardware processor, a plurality of possible codes to a plurality of subscore bins;

receiving, by the at least one hardware processor, a plurality of actual codes associated with a plurality of network traffic messages, wherein the plurality of possible codes comprises the plurality of actual codes, wherein the plurality of possible codes and the plurality of actual codes comprise error codes, and wherein the plurality of network traffic messages comprise outgoing messages each sent to one or more recipients;

calculating, by the at least one hardware processor, a deliverability score based on the plurality of possible codes assigned to the plurality of subscore bins and the plurality of actual codes; and rendering, via one of one or more computing devices by the at least one hardware processor, the deliverability score on an online dashboard.

2. The method of claim 1, further comprising:

transmitting, by the at least one hardware processor, the plurality of network traffic messages;

presenting, by the at least one hardware processor, one or more recommendations, wherein the one or more recommendations are associated with at least one subscore for at least one of the plurality of subscore bins;

receiving, by the at least one hardware processor, an acceptance of the one or more recommendations; and in response to receiving the acceptance of the one or more recommendations, performing, by the at least one hardware processor, a remedial action.

3. The method of claim 1, further comprising:

calculating, by the at least one hardware processor, a subscore for each of the plurality of subscore bins based on the plurality of actual codes, wherein the plurality of subscore bins comprises a sent rate bin, a compliance bin, a fraud bin, a latency bin, and an engagement bin.

4. The method of claim 3, wherein calculating the subscore for each of the plurality of subscore bins is further based on one or more performance metrics associated with the plurality of network traffic messages.

5. The method of claim 4, wherein the one or more performance metrics are calculated by:

applying, by the at least one hardware processor, a machine learning algorithm to a plurality of historical network traffic messages;

determining, by the at least one hardware processor, one or more benchmarks associated with at least one of the plurality of subscore bins; and determining, by the at least one hardware processor, a variance from the one or more benchmarks based on the plurality of network traffic messages.

6. The method of claim 1, wherein the deliverability score and subscores for each of the plurality of subscore bins are configured to be filtered based on the plurality of network traffic messages.

7. The method of claim 1, wherein subscores for each of the plurality of subscore bins and the deliverability score are calculated based on the plurality of network traffic messages transmitted during a predetermined time period.

8. A system, comprising:

a memory device; and at least one hardware processor communicatively coupled to the memory device, the at least one hardware processor being configured to:

assign a plurality of possible codes to a plurality of subscore bins;

receive a plurality of actual codes associated with a plurality of network traffic messages, wherein the plurality of possible codes comprises the plurality of actual codes, wherein the plurality of possible codes and the plurality of actual codes comprise error codes, and wherein the plurality of network traffic messages comprise outgoing messages each sent to one or more recipients;

calculate a deliverability score based on the plurality of possible codes assigned to the plurality of subscore bins and the plurality of actual codes; and render the deliverability score on an online dashboard.

9. The system of claim 8, wherein the at least one hardware processor is further configured to:

transmit the plurality of network traffic messages;

present one or more recommendations, wherein the one or more recommendations are associated with at least one subscore for at least one of the plurality of subscore bins;

receive an acceptance of the one or more recommendations; and in response to receiving the acceptance of the one or more recommendations, perform a remedial action.

10. The system of claim 8, wherein the at least one hardware processor is further configured to:

calculate a subscore for each of the plurality of subscore bins based on the plurality of actual codes, wherein the plurality of subscore bins comprises a sent rate bin, a compliance bin, a fraud bin, a latency bin, and an engagement bin.

11. The system of claim 10, wherein calculating the subscore for each of the plurality of subscore bins is further based on one or more performance metrics associated with the plurality of network traffic messages.

12. The system of claim 11, wherein the at least one hardware processor is configured to calculate the one or more performance metrics by:

applying a machine learning algorithm to a plurality of historical network traffic messages;

determining one or more benchmarks associated with at least one of the plurality of subscore bins; and determining a variance from the one or more benchmarks based on the plurality of network traffic messages.

13. The system of claim 8, wherein the deliverability score and subscores for each of the plurality of subscore bins are configured to be filtered based on the plurality of network traffic messages.

14. The system of claim 8, wherein subscores for each of the plurality of subscore bins and the deliverability score are calculated based on the plurality of network traffic messages transmitted during a predetermined time period.

15. A non-transitory computer-readable medium embodying a program that, when executed by at least one hardware processor, causes the at least one hardware processor to:

assign a plurality of possible codes to a plurality of subscore bins;

receive a plurality of actual codes associated with a plurality of network traffic messages, wherein the plurality of possible codes comprises the plurality of actual codes, wherein the plurality of possible codes and the plurality of actual codes comprise error codes, and wherein the plurality of network traffic messages comprise outgoing messages each sent to one or more recipients;

calculate a deliverability score based on the plurality of possible codes assigned to the plurality of subscore bins and the plurality of actual codes; and render the deliverability score on an online dashboard.

16. The non-transitory computer-readable medium of claim 15, wherein the program further causes the at least one hardware processor to:

transmit, via the plurality of network traffic messages;

present one or more recommendations, wherein the one or more recommendations are associated with at least one subscore for at least one of the plurality of subscore bins;

receive an acceptance of the one or more recommendations; and in response to receiving the acceptance of the one or more recommendations, perform a remedial action.

17. The non-transitory computer-readable medium of claim 15, wherein the program further causes the at least one hardware processor to:

calculate a subscore for each of the plurality of subscore bins based on the plurality of actual codes, wherein the plurality of subscore bins comprises a sent rate bin, a compliance bin, a fraud bin, a latency bin, and an engagement bin.

18. The non-transitory computer-readable medium of claim 17, wherein calculating the subscore for each of the plurality of subscore bins is further based on one or more performance metrics associated with the plurality of network traffic messages.

19. The non-transitory computer-readable medium of claim 18, wherein the program further causes the at least one hardware processor to calculate the one or more performance metrics by:

applying a machine learning algorithm to a plurality of historical network traffic messages;

determining one or more benchmarks associated with at least one of the plurality of subscore bins; and determining a variance from the one or more benchmarks based on the plurality of network traffic messages.

20. The non-transitory computer-readable medium of claim 15, wherein the deliverability score and subscores for each of the plurality of subscore bins are configured to be filtered based on the plurality of network traffic messages.

* * * * *